(12) United States Patent
Sako

(10) Patent No.: US 9,670,814 B2
(45) Date of Patent: Jun. 6, 2017

(54) MOUNTING MEMBER FOR POLLUTION CONTROL ELEMENT, MANUFACTURING METHOD THEREOF, AND POLLUTION CONTROL DEVICE

(75) Inventor: Kenji Sako, Yokohama (JP)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 528 days.

(21) Appl. No.: 13/981,790

(22) PCT Filed: Jan. 31, 2012

(86) PCT No.: PCT/US2012/023249
§ 371 (c)(1),
(2), (4) Date: Jul. 25, 2013

(87) PCT Pub. No.: WO2012/106295
PCT Pub. Date: Aug. 9, 2012

(65) Prior Publication Data
US 2013/0305697 A1    Nov. 21, 2013

(30) Foreign Application Priority Data
Jan. 31, 2011  (JP) .................... 2011-018570

(51) Int. Cl.
*B01D 50/00* (2006.01)
*F01N 3/28* (2006.01)
(Continued)

(52) U.S. Cl.
CPC ............... *F01N 3/28* (2013.01); *C04B 35/80* (2013.01); *D04H 1/413* (2013.01);
(Continued)

(58) Field of Classification Search
CPC . F01N 3/28; F01N 3/2853; C04B 2235/3817; C04B 2235/5224
(Continued)

(56) References Cited

U.S. PATENT DOCUMENTS 4,385,135 A   5/1983   Langer
7,951,731 B2  5/2011   Mitani
(Continued)

FOREIGN PATENT DOCUMENTS

EP   0319299      6/1989
JP   57-061686    4/1982
(Continued)

OTHER PUBLICATIONS

PCT International Search Report for PCT/US2012/023249, mailed May 31, 2012.

*Primary Examiner* — Tom P Duong

(57) ABSTRACT

A mounting member that can sufficiently suppress scattering of inorganic fiber material when a pollution control element is assembled in a casing, and that can maintain sufficiently high contact pressure between the inner surface of the casing and the pollution control element, even after the organic binder has combusted. The mounting member of the present invention is for wrapping and mounting a pollution control element (30) in a casing (20), and provides a mat (1) made from inorganic fiber material, and an aggregated substance (5) containing an organic binder and inorganic fine particles that is impregnated throughout most of the mat (1).

20 Claims, 4 Drawing Sheets

(51) Int. Cl.

| | | |
|---|---|---|
| *C04B 35/80* | (2006.01) | |
| *D04H 1/4209* | (2012.01) | |
| *D04H 1/58* | (2012.01) | |
| *D04H 1/587* | (2012.01) | |
| *D21H 13/36* | (2006.01) | |
| *D21H 17/37* | (2006.01) | |
| *D04H 1/413* | (2012.01) | |
| *D04H 1/64* | (2012.01) | |

(52) U.S. Cl.
CPC ............ *D04H 1/4209* (2013.01); *D04H 1/58* (2013.01); *D04H 1/587* (2013.01); *D04H 1/64* (2013.01); *D21H 13/36* (2013.01); *D21H 17/37* (2013.01); *C04B 2235/3218* (2013.01); *C04B 2235/3232* (2013.01); *C04B 2235/3244* (2013.01); *C04B 2235/3418* (2013.01); *C04B 2235/3817* (2013.01); *C04B 2235/3852* (2013.01); *C04B 2235/5224* (2013.01); *C04B 2235/5256* (2013.01); *F01N 3/2853* (2013.01); *Y10T 24/33* (2015.01)

(58) Field of Classification Search
USPC .......................................................... 422/179
See application file for complete search history.

(56) References Cited

U.S. PATENT DOCUMENTS

| | | |
|---|---|---|
| 8,533,950 B2 | 9/2013 | Eguchi |
| 2002/0025904 A1 | 2/2002 | Goto |
| 2003/0185725 A1 | 10/2003 | Mutou |
| 2004/0052694 A1* | 3/2004 | Nishikawa ........ C04B 35/62245 422/177 |
| 2005/0272602 A1 | 12/2005 | Ninomiya |
| 2007/0207069 A1 | 9/2007 | Kariya |
| 2008/0078150 A1 | 4/2008 | Kariya |
| 2009/0025377 A1 | 1/2009 | Yasuda |
| 2009/0049831 A1 | 2/2009 | Yasuda |
| 2009/0072498 A1* | 3/2009 | Tanahashi .............. B82Y 30/00 277/650 |
| 2009/0285726 A1 | 11/2009 | Ohshika |
| 2010/0055004 A1 | 3/2010 | Olson |
| 2010/0173552 A1 | 7/2010 | Fernando |
| 2010/0266462 A1 | 10/2010 | Kumar |
| 2011/0036063 A1 | 2/2011 | Kumar |
| 2011/0097246 A1 | 4/2011 | Beauharnois |
| 2012/0171457 A1 | 7/2012 | De Rovere |

FOREIGN PATENT DOCUMENTS

| | | |
|---|---|---|
| JP | S59230737 | 12/1984 |
| JP | H03107518 | 5/1991 |
| JP | 2001027117 | 1/2001 |
| JP | 2001259438 | 9/2001 |
| JP | 2002293954 | 10/2002 |
| JP | 2002302875 | 10/2002 |
| JP | 2008201125 | 9/2008 |
| WO | WO 2007/117934 | 10/2007 |

* cited by examiner

MOUNTING MEMBER FOR POLLUTION CONTROL ELEMENT, MANUFACTURING METHOD THEREOF, AND POLLUTION CONTROL DEVICE

CROSS REFERENCE TO RELATED APPLICATIONS

This application is a national stage filing under 35 U.S.C. 371 of PCT/US2012/023249, filed Jan. 31, 2012, which claims priority to Japan Application No. 2011-018570, filed Jan. 31, 2011, the disclosures of which are incorporated by reference in their entireties herein.

FIELD OF INVENTION

The present invention relates to a mounting member of a pollution control element such as a catalyst carrier or filter element, and to a manufacturing method thereof. Furthermore, the present invention relates to a pollution control device wherein a pollution control element is mounted in a casing by the mounting member.

BACKGROUND

An exhaust gas cleaning system using a ceramic catalytic converter is known as means for removing carbon monoxide (CO), hydrocarbons (HC), and nitrogen oxides (NOx) and the like that are included in exhaust gas from automobile engines. Basically, the ceramic catalytic converter generally stores a ceramic catalyst carrier with a honeycomb shape or the like in a metal casing.

There are various types of ceramic catalytic converters, but a general form provides a catalyst carrier, a casing that stores the catalyst carrier, and a thermal insulation member that fills a gap between the outer surface of the catalyst carrier and the inner surface of the casing. The thermal insulation member mounts the catalyst carrier and prevents mechanical shock due to impact and vibration and the like from being inadvertently applied to the catalyst carrier. Thereby, moving and breaking of the catalyst carrier can be sufficiently suppressed, and thus the desired effect can be provided over a long period of time. This type of thermal insulation member is also commonly called a mounting member because the member has a function of mounting a pollution control element such as a catalyst carrier.

Japanese Unexamined Patent Applications Publication Nos. S57-61686 and 2002-66331 teach that, normally, the mounting member is primarily made of inorganic fibers, from the prospect of providing excellent thermal insulation and heat resistance. However, inorganic fibers can scatter broken pieces and powder and the like (hereinafter also referred to as "fiber pieces") when the pollution control element is assembled in the casing, and there is a possibility of having a negative effect on the surrounding environment. Therefore, conventionally there have been investigations into impregnating or applying an organic binder onto a mat made of inorganic fibers in order to prevent scattering of the fiber pieces. For example, Japanese Unexamined Patent Application Publication No. 2006-223920 describes a mounting member where at least two types of organic binders with different glass transition temperatures (Tg) are impregnated into a mat made of fiber materials.

SUMMARY OF THE INVENTION

Incidentally, during the process of cleaning the exhaust gas from an automobile engine, the temperature inside the chamber can reach approximately 900° C. Normally, after use of the pollution control device has started, the organic binder included in the mounting member is combusted and eliminated from inside the casing. Even after the organic binder has combusted, the mounting member is required to maintain high contact pressure in order for the mounting material to sufficiently demonstrate a function of preventing breaking and moving of the pollution control element.

An object of the present invention is to provide a mounting member that can suppress scattering of inorganic fiber materials when a pollution control element is assembled in a casing, and that can maintain the required contact pressure to hold the pollution control element in the casing even after the organic binder has combusted.

The mounting member according to one aspect of the present invention is for wrapping and mounting a pollution control element inside a casing, and provides a mat made of inorganic fiber material, wherein most of the mat is impregnated with an aggregated substance that contains an organic binder and inorganic fine particles.

The pollution control device according to another aspect of the present invention provides a casing, a pollution control element installed in the casing, and the aforementioned mounting member provided between the casing and the pollution control element.

The manufacturing method of the mounting member for wrapping and mounting the pollution control element inside the casing according to another aspect of the present invention provides a step of preparing a liquid where an aggregated substance containing an organic binder and inorganic fine particles has precipitated, and a step of impregnating the aggregated substance into a mat made of inorganic fiber material.

EFFECT OF THE INVENTION

According to the present invention, the aggregated substance containing the organic binder and inorganic fine particles is impregnated throughout most of the mat, and therefore scattering of the inorganic fiber material can be suppressed by the organic binder when assembling the pollution control element into the casing, and even after the organic binder has combusted, the required contact pressure for mounting the pollution control element in the casing can be maintained by the inorganic fine particles that remain.

DETAILED DESCRIPTION OF THE INVENTION

Figure 1:
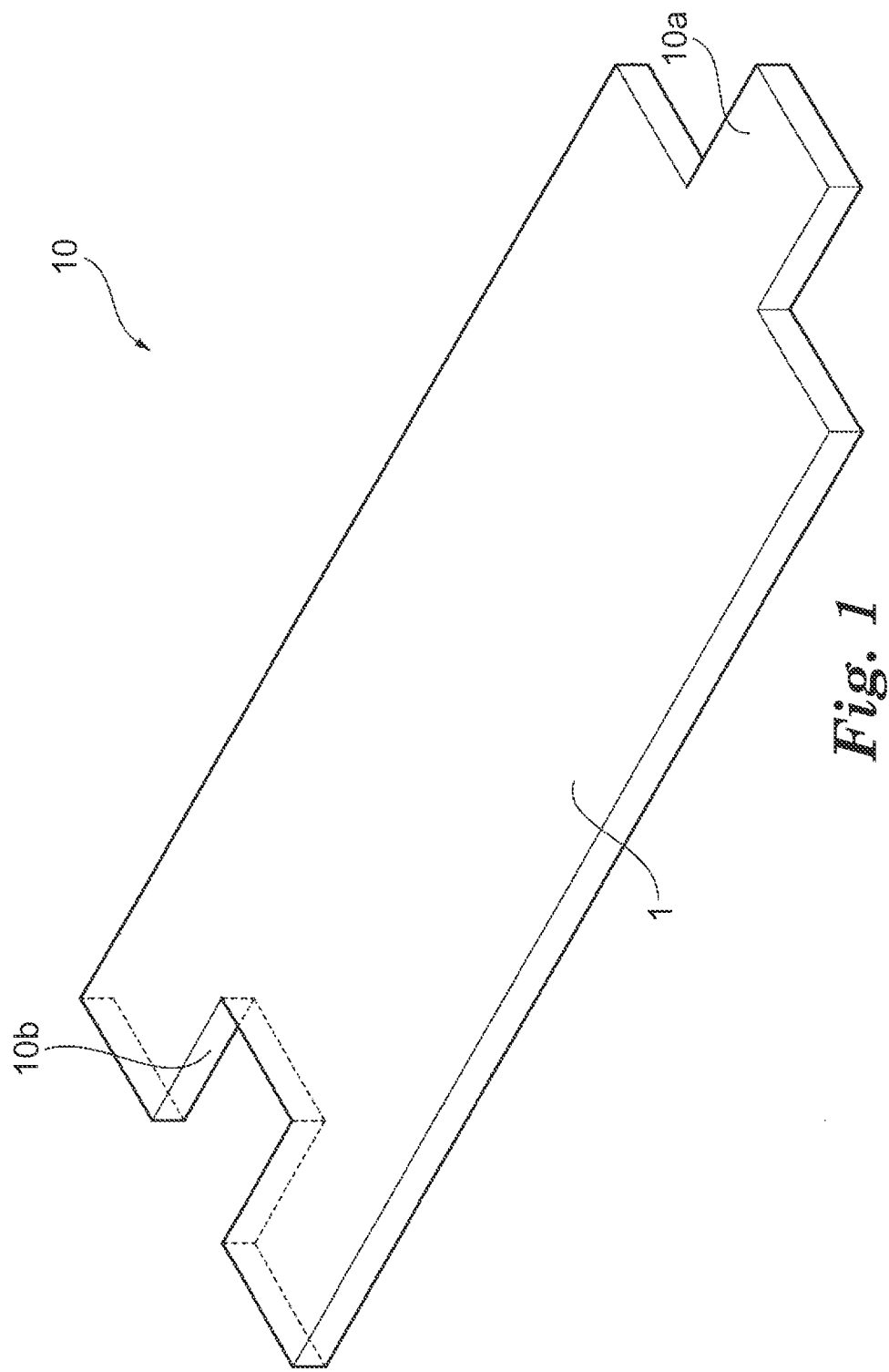
FIG. 1 is a perspective view illustrating one embodiment of the mounting member of the present invention.

The mounting member according to one aspect of the present invention is for wrapping and mounting a pollution control element in a casing, and provides a mat made of inorganic fiber material impregnated with an aggregated substance containing an organic binder and inorganic fine particles.

With this mounting member, the organic binder and the fine particles are integrated as an aggregated substance, and impregnated into the mat, and therefore both components are dispersed into the entire mat and adhere to the inorganic fibers in the mat, and thus various functions can be effectively demonstrated. The organic binder suppresses scattering of fiber pieces during the process of manufacturing the pollution control device, and furthermore, the inorganic fine particles remain in the mat after the organic binder has combusted, and demonstrate an effect of maintaining sufficiently high contact pressure between the inside surface of the casing and the pollution control element.

The inorganic fine particles are impregnated into the mat together with the organic binder as a an aggregated substance, and therefore before heat is applied to the mounting member, the inorganic fine particles will adhere together with the organic binder to the surface and intersection points of the inorganic fibers. Later, when the mounting member is exposed to high temperature conditions where the organic binder will combust, sintering of the inorganic fine particles will proceed and the inorganic fine particles that have adhered to the surface of the inorganic fiber material will attach to the inorganic fibers increasing the roughness of the surface of the inorganic fibers and possibly playing a role in inhibiting sliding of the inorganic fibers together. On the other hand, the inorganic fine particles that attach to the intersection points of the inorganic fibers will restrain the intersection points and are thought to play a role in maintaining the three-dimensional shape of the inorganic fibers. It is thought that the mounting member will not easily be compressed in the thickness direction and sufficiently high contact pressure can be maintained by the function of these inorganic fine particles.

Examples of the inorganic fine particles include particles made from at least one type of material selected from the group consisting of metal oxides, nitrides, carbides, and composite materials thereof. Furthermore, if inorganic fine particles with an average diameter of 1 µm or less are used the surface energy will be high, so the sintering properties will be enhanced (in other words sintering will more easily occur), and therefore the attaching properties to the inorganic fibers can be made stronger.

Furthermore, the inorganic fine particles can demonstrate an effect of maintaining the contact pressure as described above, so the amount of the organic binder impregnated into the mat can be relatively reduced. These merits are particularly useful on a control system for a highly advanced automobile engine. This is because there is a possibility of inadvertent actuation of the control system sensor in conjunction with combustion, if excessive organic binder is included in the mounting member. In particular, if an acrylic latex with a glass transition temperature of 15° C. or lower is used as the organic binder, the organic binder will have sufficiently high wetting properties with regards to the inorganic fibers at room temperature where the assembly work is performed, and therefore scattering of the inorganic fibers can be effectively suppressed. Scattering of the fiber pieces can be sufficiently suppressed even if the content of the organic binder based on the total amount of material in the mounting member is for example 5 weight % or less.

The pollution control device of the present embodiment has a casing, a pollution control element provided in the casing, and the mounting member of the present embodiment placed between the casing and the pollution control element. By using the mounting member of the present embodiment for mounting the pollution control element, scattering of inorganic fiber material during the manufacturing process can be sufficiently suppressed, and sufficiently high contact pressure can be maintained between the inner surface of the casing and the pollution control element even after the organic binder has combusted.

Furthermore, the manufacturing method of the mounting member of the present embodiment includes (a) a step of preparing a solution with precipitated aggregated substance containing an organic binder and inorganic fine particles, and (b) impregnating the aggregated substance into a mat made of inorganic fiber material.

With the aforementioned manufacturing method, an aggregated substance containing the organic binder and the inorganic fine particles is first precipitated, and then the aggregated substance is impregnated into the mat. Therefore, inorganic fine particles can be attached together with the organic binder throughout most of the mat with a more uniform dispersibility that could not easily be obtained by independently impregnating with the organic binder and the inorganic fine particles.

The aforementioned step (a) preferably includes a step of preparing a solution with aggregated substance precipitated from a blend containing the organic binder and a colloidal solution dispersed with organic fine particles. Using a colloid solution has the advantage that a solution containing aggregated substances with sufficiently uniform size can easily be produced.

Preferred embodiments of the present invention are described below in detail while referring to the drawings.

FIG. 1 is a perspective view showing an example of a mounting member of the present embodiment. The mounting member 10 illustrated in the same drawing is for wrapping a pollution control element 30 with a circular cylinder or elliptical cylinder outer shape and mounting in a casing 20 (refer to FIG. 4). The mounting member 10 has a length that corresponds to the length of the outer circumference of the pollution control element 30. The mounting member 10 has a convex part 10a on one end, and a concave part 10b on the other end, and when the mounting member 10 is wrapped around the pollution control element 30, the convex part 10a is inserted into the concave part 10b. Note, the mounting member 10 does not necessarily have a convex part 10a and a concave part 10b.

Figure 2:
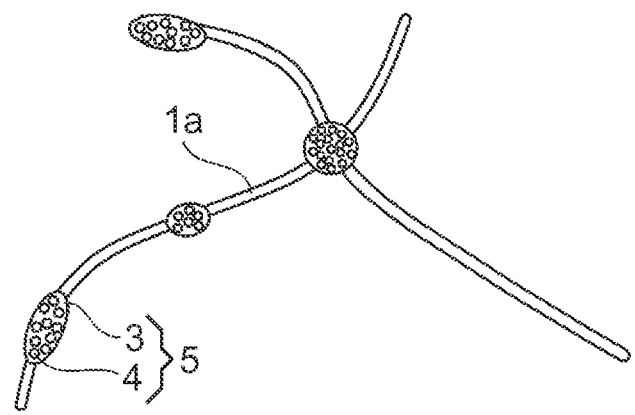
FIG. 2 is a schematic diagram illustrating the condition where the aggregated substance has adhered to the inorganic fibers prior to the mounting member of the present invention being exposed to high temperature conditions.

The mounting member 10 contains a mat 1 made of inorganic fiber material, and an aggregated substance 5 containing the organic binder and the inorganic fine particles, impregnated into the mat 1. As shown in the schematic diagram of FIG. 2, prior to the mounting member 10 being exposed to high temperature conditions, the aggregated substance 5 contains an organic binder 3 and inorganic fine particles 4, and is attached to the inorganic fibers 1a that compose the mat 1. The organic binder 3 covers at least a portion of the surface of the organic fibers 1a, and prevents scattering of fiber pieces. Note, FIG. 2 is a conceptual schematic diagram for aiding in understanding about a structural example of the aggregated substance 5 and the inorganic fibers 1a in the mat 1. The mat 1, organic binder, and inorganic fine particles that compose the mounting member 10 are described below.

The mat 1 is made of inorganic fiber material, and preferably is made of an inorganic fiber material containing alumina fibers. The inorganic fiber material can combine two or more types of alumina fibers, and if necessary, the alumina fibers can also be combined with other inorganic materials. The inorganic materials that can also be used are not restricted to the following materials, but can include silica fibers, glass fibers, bentonite, vermiculite, and graphite and the like. These inorganic materials can be used individually, or two or more types can be combined and used together.

The inorganic fibers that form the mat 1 are not restricted to a thickness in particular (average diameter), but the average diameter is preferably from approximately 2 to 7 μm. If the inorganic fibers have an average diameter smaller than approximately 2 μm, the inorganic fibers will tend to be brittle and lack strength, but on the other hand, if the average diameter is larger than approximately 7 μm, forming the mounting member will tend to be difficult.

Furthermore, similarly to the thickness, the length of the inorganic fibers is also not restricted in particular. However, the inorganic fibers preferably have an average length from approximately 0.5 to 50 mm. If the average length of the inorganic fibers is less than approximately 0.5 mm, the effect of using the organic fibers to form the mounting member and the like cannot be demonstrated, and conversely, if the average length is larger than approximately 50 mm, handling properties will be inferior, and therefore the process of manufacturing the mounting member will not easily proceed smoothly.

The mat 1 can be an alumina fiber mat primarily made of a multilayer sheet of alumina fibers. The average length of the alumina fibers in the alumina fiber mat is preferably in a range from approximately 20 to 200 mm, and the thickness of the fibers (average diameter) is preferably in a range from approximately 1 to 40 μm. Furthermore, the alumina fibers are preferably made of mullite with a weight ratio of $Al_2O_3/SiO_2$ ($Al_2O_3/SiO_2$)=approximately 70/30 to 74/26.

For example, the alumina fiber mat can be manufactured using a spinning stock solution made from a blend of aluminum oxychloride or the like as an aluminum source, silica sol or the like as a silica source, a polyvinyl alcohol or the like as an organic binder, and water. In other words, the aforementioned mat can be manufactured by overlaying spun alumina fiber precursor to form a sheet, and then firing at a high temperature normally from approximately 1000 to 1300 degrees Celsius. Note, needle punching can also be performed on the sheet that is formed.

When manufacturing this type of alumina fiber mat, other ceramic fibers and inorganic swelling materials can also be supplementarily added to the alumina fiber. In this case, the added material can be uniformly blended into the mat, but the cost can be reduced while maintaining the performance of the additive material by providing locally while avoiding areas that will be heated in particular. The ceramic fibers can be silica fibers or glass fibers or the like, and the inorganic swelling material can be bentonite, swelling vermiculite, or swelling graphite or the like.

As shown in the schematic diagram of FIG. 2, the organic binder adheres to the inorganic fibers 1a and suppresses scattering of the fiber pieces. Suitable examples of the organic binder 3 include natural and synthetic polymer materials, such as resin materials like butadiene-styrene resin, polystyrene resin, polyvinyl acetate resin, and acrylic resin and the like or organic materials such as polyvinyl alcohols and the like. The organic binder is preferably an acrylic-based latex.

The acrylic-based latex can be a plurality of types, but is preferably selected from those having a favorable glass transition temperature (Tg), from the perspective of the properties required of the mounting member 10 composition and the pollution control element 30. Acrylic-based latexes are known to have a glass transition temperature Tg that is normally in a range from approximately −70 to 50° C., and with the present embodiment, latex with a Tg of 15° C. or lower is preferable, but latex with a Tg of 1° C. or lower or 10° C. or lower can also be used. If an acrylic-based latex with a Tg of 15° C. or fewer is used, sufficiently high wettability can be demonstrated towards the inorganic fibers in the mat at standard working temperatures (25° C.) where the pollution control element 30 is mounted in the casing 20, and therefore scattering of the fiber pieces can be effectively suppressed.

The organic binder that is used with the present embodiment can be various types of acrylic-based latexes so long as there is not a negative effect on the properties of the mounting member 10 and the like, and if preferred, an acrylic-based latex can be commercially procured and used as is, or can be arbitrarily modified to match the environment where the mounting member will be used. A suitable acrylic-based latex is a colloidal dispersion obtained by dispersing an acrylic-based resin in a water-based medium or other medium.

The content of the organic binder 3 in the mounting member 10 is preferably 5 mass % or less, for example 4 mass % or less, 3 mass % or less, or 2 mass % or less, based on the total mass of the mounting member 10. By suppressing the content of the organic binder, the risk of inadvertent sensor function and the like of the automobile control system due to combustion or the like thereof can be eliminated. The lower limit of the organic binder content is preferably 0.1 mass %, from the perspective of preventing scattering of the fiber pieces.

The inorganic fine particles 4 together with the organic binder 3 compose the aggregated substance 5. The inorganic fine particles 4 are not independently impregnated into the mounting member, but rather are impregnated into the mat as an aggregated substance 5 with the organic binder 3, and therefore as shown in FIG. 2, the inorganic fine particles 4 together with the organic binder are attached to the surface and intersection points of the inorganic fibers in the mat. In other words, the organic fine particles exist throughout most of the mat in a favorably dispersed condition that is difficult to obtain when independently impregnating inorganic particles.

Figure 3:
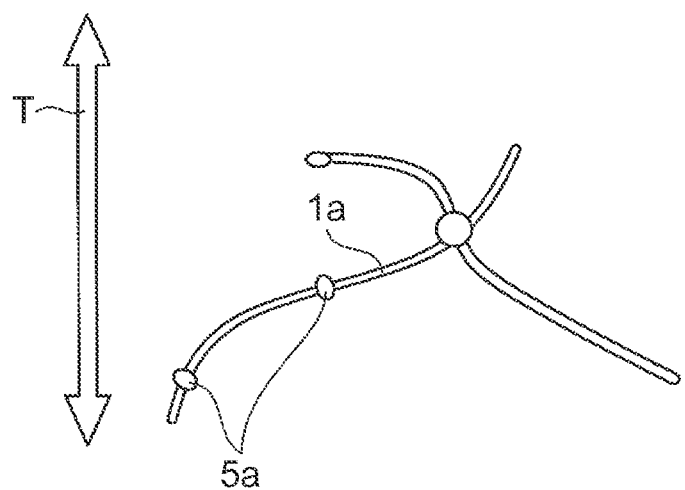
FIG. 3 is a schematic diagram illustrating the condition where sintered inorganic fine particles are attached to the inorganic fibers after the mounting member of the present invention has been exposed to high temperature conditions.

Even after the organic binder 3 is combusted, the mounting member 10 contributes to maintaining sufficiently high contact pressure between the inner surface of the casing 20 and the pollution control element 30. When the mounting member 10 is stored in the casing 20 and exposed to high temperature conditions such that the organic binder combusts, inorganic fine particles 4 with high surface energy will be sintered. At this time, as shown in the schematic diagram of FIG. 3, the inorganic fine particles 4 that adhere to the surface of the inorganic fibers 1a will form sintered bodies 5a and attach to the inorganic fibers 1a, and will increase the roughness of the surface of the inorganic fibers 1a. On the other hand, the inorganic fine particles 4 that adhere to the intersection points of the inorganic fibers 1a will form sintered bodies 5b and will restrain the movement of the inorganic fibers 1a at the intersection points. As a result, the mounting member 10 will not easily compress in the thickness direction (direction of arrow T in FIG. 3), and thus sufficiently high contact pressure can be maintained. Note, similarly to FIG. 2, FIG. 3 is also a conceptual schematic diagram to aid in understanding concerning a structural example of the inorganic fibers 1a and the inorganic fine particles 4 in the mat after combustion of the organic binder.

The inorganic fine particles 4 can be particles that can attach to the inorganic fibers 1*a*, but preferable specific examples include fine particles made of metal oxides, nitrides, carbides, and composite materials thereof. These fine particles can be used individually as a single type, or two or more types can be used in combination. If the mat 1 contains alumina fibers, the inorganic fine particles 4 are preferably selected from silica fine particles, alumina fine particles, titania fine particles, and zirconia fine particles, from the perspective of reactivity with the alumina fibers.

Note, with the present embodiment, the size and shape of the inorganic fine particles is not particularly restricted so long as the particles come together with the organic binder to form an aggregated substance, impregnate into the mounting member, and attach to the inorganic fibers, and if this mounting member is used in a pollution control device, the inorganic fine particles can remain in the mat even after the organic binder has combusted. However, the average diameter of the inorganic fine particles 4 is preferably 1 μm or less, and more preferably 500 nm or less, from the perspective of sintering properties. The lower limit of the average particle diameter of the inorganic fine particles 4 is preferably 1 nm, and more preferably 4 nm, from the perspective of handling properties and ease of procurement. Note, the average particle diameter can typically be measured using a BET method for example.

The content of inorganic fine particles 4 in the mounting member 10 is preferably 10 mass % or less, and more preferably 5 mass % or less, based on the total mass of the mounting member 10. For example, if more than 20 mass % of inorganic fine particles 4 is added to the mounting member 10, there will be a tendency for the necessary amount of the organic binder to increase. On the other hand, if the content of inorganic fine particles 4 is less than 0.1 mass %, maintaining the contact pressure will likely be insufficient.

The aggregated substance 5 containing the inorganic fine particles 4 and the organic binder 3 is preferably uniformly dispersed throughout the entire mounting member 10. On the other hand, if the mounting member 10 is observed by thickness, the aggregated substance 5 is preferably essentially uniformly dispersed in the thickness direction of the mounting member 10.

Next, the manufacturing method of the mounting member 10 is described. The manufacturing method according to the present embodiment provides (a) a step of preparing a liquid with precipitated an aggregated substance containing an organic binder and inorganic fine particles, and (b) a step of impregnating the aggregated substance into a mat 1.

Step (a) preferably includes a step of preparing a solution with the precipitated aggregated substance from a blend containing the organic binder and a colloidal solution dispersed with inorganic fine particles. The aforementioned materials can be used as the organic binder and the inorganic fine particles. Preferable examples of colloidal solutions where the inorganic fine particles are dispersed (inorganic sols) include silica sol, alumina sol, titania sol, and zirconia sol and the like. For example, the silica sol can be commercial Snowtex (registered trademark, Nissan Chemical Industries, Ltd.) and the like. Using a colloid solution has the advantage that a solution containing aggregated substances with sufficiently uniform size can easily be produced.

In order to precipitate the aggregated substance in the liquid in step (a) sufficiently, the pH of the solution is preferably adjusted either before or after the organic binder and the colloid solution are added to the liquid. In other words, an electrolyte such as aluminum sulfate is added to water and mixed to adjust the pH of the water to from 4 to 6. The aggregated substance can be sufficiently precipitated by adding and mixing a desired amount of the organic binder and the colloid solution into this liquid, and then adding a flocculating agent such as an organic flocculating agent like polyacrylamide or an aluminate salt.

The diameter of the aggregated substances in the liquid can be adjusted via pH adjustment or via the type and amount of flocculating agent added after mixing the organic binder and the colloidal solution. Note, the solution where the precipitated aggregated substance is dripped onto a preparation using an eyedropper and then an enlarged photograph is taken at an enlargement factor of 20 to 200 times using an optical microscope, the maximum diameter of 20 aggregated substance particles are measured from the photograph, and the average diameter of the aggregated substance in the liquid can be determined from this average value. The inorganic particles themselves are extremely small, so when impregnating with the liquid, sliding will easily occur between the inorganic fibers of the mat, and even materials that do not easily attach to the inside of the mat will easily remain between the inorganic fibers of the mat by providing as an aggregated substance. In particular, if the average particle diameter of the aggregated substance in the liquid is approximately 20 μm or larger and 100 μm or smaller, the aggregated substance will more easily remain in the mat when the liquid is impregnated into the mat. Furthermore, if the average particle diameter of the aggregated substances is approximately 2 mm or less, or approximately 1 mm or less, the dispersion of the aggregated substances in the mat can be more uniformly performed.

The impregnation method of step (b) is not particularly restricted, so long as the aggregated substance can be sufficiently attached to the inorganic fibers 1*a* that form the mat 1. For example, the mat 1 can be immersed in a liquid with precipitated aggregated substance, or the aggregated substance can be made to attach to the mat 1 by filtering the liquid through the mat 1.

With this manufacturing method, an aggregated substance containing organic binder and inorganic fine particles is first precipitated, and then the aggregated substance is impregnated into the mat, and therefore inorganic fine particles can be attached together with the organic binder throughout most of the mat with more uniform dispersibility, which could not easily be obtained by independently impregnating with organic binder and inorganic fine particles or without forming an aggregated substance. The aggregated substance that contains the organic binder and the inorganic fine particles adheres with good dispersibility to the surface and intersection points of the inorganic fibers, and remains in the mat.

The average diameter of the aggregated substance that adheres to the inorganic fibers in the mat can be determined by enlarging by approximately 500 times and photographing the cross section of the mat-shaped mounting member using an SEM device, arbitrarily extracting 20 particles of aggregated substance that have adhered to the fiber surface in the photograph, reading the maximum diameter of each aggregated substance, and determining the average value of that size. The aggregated substance that is attached to the mat will have a slightly smaller size than the aggregated substance that has swelled in the impregnation solution because of drying. Concerning the average diameter, aggregated substance with a diameter of approximately 1 μm or higher, or approximately 5 μm or higher will easily remain in the mat, and if the diameter is approximately 50 μm or less, or approximately 30 μm or less, the aggregated substance will tend to be more uniformly dispersed in the entire mat.

After performing step (a) and step (b), water is removed from the mat 1 and the mat is dried to obtain the mounting member. The mounting member obtained can be cut to a desired size and shape using scissors or a cutter or the like prior to use.

Figure 4:
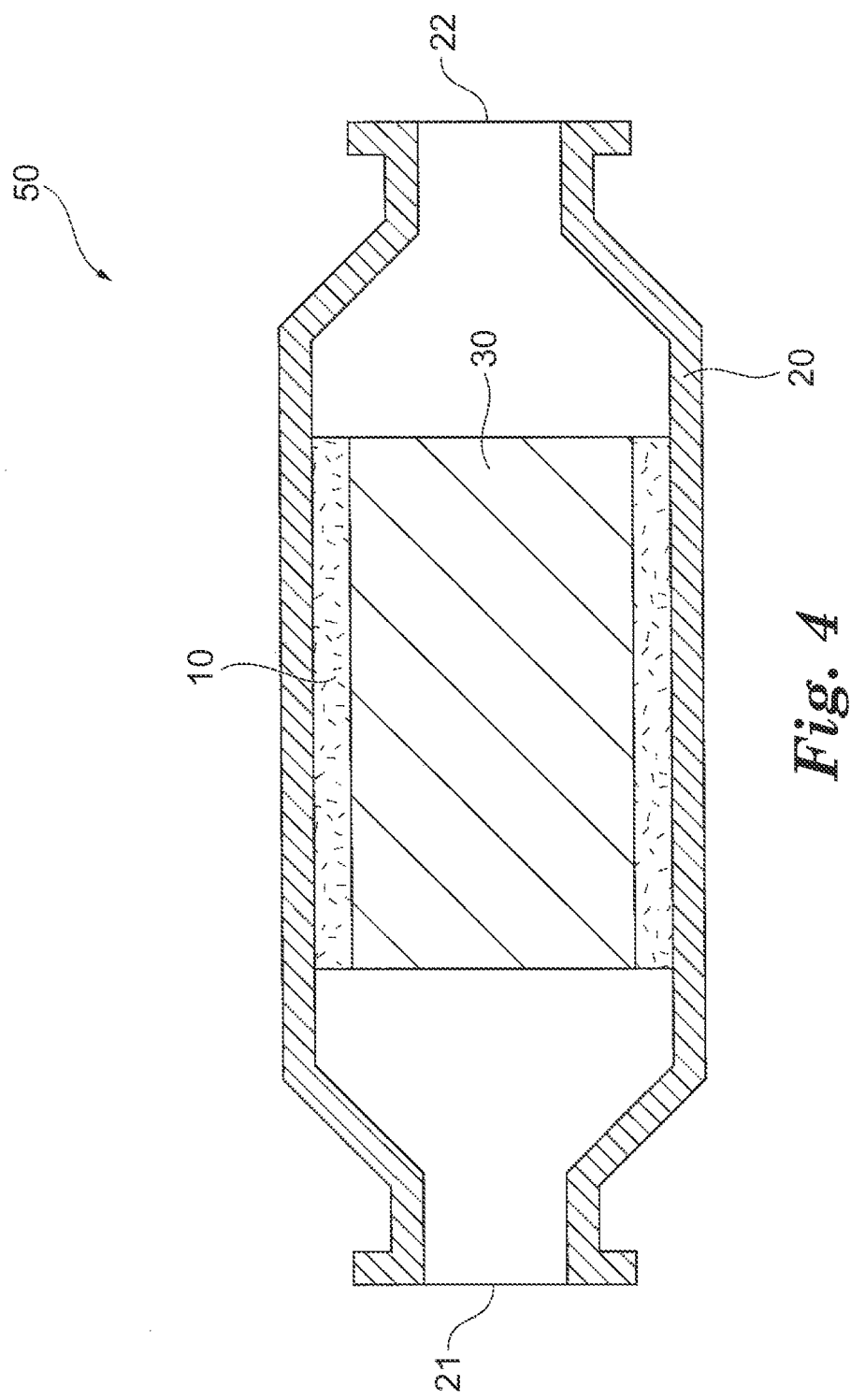
FIG. 4 is a cross section view illustrating an embodiment of the pollution control device according to the present invention.

As shown in FIG. 4, the mounting member 10 is used to mount a pollution control element 30 in a pollution control device 50. A specific example of a pollution control element 30 is a catalyst carrier or filter element or the like for cleaning the exhaust gas from an engine. A specific example of a pollution control device 50 is a catalytic converter or an exhaust cleaning device (such as a diesel particulate filter device).

The pollution control device 50 shown in FIG. 4 has a casing 20, a pollution control element 30 provided in the casing 20, and a mounting member 10 provided between the inner surface of the casing 20 and the outer surface of the pollution control element 30. The pollution control device 50 also provides a gas flow intake 21 that introduces exhaust gas to the pollution control element 30, and a gas flow outlet 22 that discharges exhaust gas that has passed through the pollution control element 30.

The width of the gap between the inner surface of the casing 20 and the outer surface of the pollution control element 30 is preferably from approximately 1.5 to 15 mm, from the perspective of reducing the amount of mounting member 10 used and ensuring hermeticity. The mounting member 10 is preferably in a suitably compressed condition in order to provide a suitable bulk density between the casing 20 and the pollution control element 30. As described above, with the mounting member 10, sufficiently high contact pressure can be maintained even after the organic binder 3 has combusted, so the bulk density during assembly can be set lower than is conventional, and thus the amount of relatively expensive inorganic fiber material that is used can be reduced.

Means for compressing and assembling the mounting member 10 include clamshell compression, stuffing compression, and tourniquet compression and the like. The mounting member 10 can be advantageously used when manufacturing a catalytic converter with a so-called pressfit construction where the mounting member is pressed under pressure into a round cylinder shaped casing 20 for example, such as with stuffing compression for example.

For example, for the case where the pollution control device 50 is a catalytic converter, the catalytic converter is preferably a so-called monolith type catalytic converter, where the catalytic converter has a monolith shaped catalyst element. The catalytic converter is made of a catalyst element with small channels with a honeycomb cross section, and therefore the size is smaller than a conventional pellet type catalytic converter. Furthermore, the contact surface area with the exhaust gas can be sufficiently ensured, so exhaust resistance can be minimized, and the exhaust gas can be processed more effectively. This catalytic converter can be advantageously used in combination with various types of internal combustion engines in order to process the exhaust gas. In particular, excellent effects can be sufficiently demonstrated when a catalytic converter of this construction is installed in an exhaust system for an automobile such as a passenger car, bus, or truck or the like.

The catalyst that is supported by the catalyst carrier is normally a metal (such as platinum, ruthenium, osmium, rhodium, iridium, nickel, or palladium or the like) or a metal oxide (such as vanadium pentaoxide or titanium dioxide or the like), and is preferably used in a coated form.

EXAMPLES

The present invention is described while referring to working examples. Note, naturally, the present invention is not restricted to these working examples.

Example 1

6 g of aluminum sulfate was added and mixed with 10 L of water. The pH of the aqueous solution obtained was 4.5. 2.6 g of the following organic binder and 10 g of silica sol were added to the aqueous solution to obtain a dispersion. 3.5 g of the following liquid sodium aluminate was added to this dispersion to prepare a solution with precipitated aggregated substance containing the organic binder and the inorganic fine particles.

Organic binder: Nipol LX874 (product name) manufactured by Japan Zeon Corporation, Tg: −31° C.;
Silica sol: Snowtex O (product name) manufactured by Nissan Chemical Industries, Ltd., average particle diameter 10 to 20 nm;
Liquid sodium aluminate: Nalco 2372 (product name) manufactured by Nalco Chemical Company.

A needle punched alumina fiber blanket (Maftec MLS-2 Blanket (product name) manufactured by Mitsubishi Plastics Inc.) was cut in 25 cm squares, and placed on a mesh in a square papermaking machine. The aforementioned solution was poured onto the top of the blanket and made to pass through the blanket. The filtrate was recovered under the blanket. After the aggregated substance was impregnated into the blanket in this manner, the blanket was dried for 60 minutes in a warm air dryer set to a temperature of 120° C. to obtain a mounting member.

Example 2

A mounting member was prepared similarly to example 1, except that 1 g of aluminum sulfate was added and mixed with 10 L of water to obtain an aqueous solution with a pH of 6.2, and a solution with precipitated aggregated substance of an organic binder and inorganic fine particles was prepared by adding 1 g of liquid sodium aluminate to a dispersion containing an organic binder (2.6 g) and inorganic fine particles.

Example 3

A mounting member was prepared similarly to example 1, except that an organic binder with a Tg of −13° C. (Nipol LX821 (product name) manufactured by Japan Zeon Corporation) was used in place of the organic binder with a Tg of −31° C. The formulation amounts and the like are shown in Table 1.

Example 4

A mounting member was prepared similarly to example 1, except that an organic binder with a Tg of +1° C. (Nipol LX811H (product name) manufactured by Japan Zeon Corporation) was used in place of the organic binder with a Tg of −31° C. The formulation amounts and the like are shown in Table 1.

Example 5

A mounting member was prepared similarly to example 1, except that an organic binder with a Tg of +25° C. (Nipol LX814 (product name) manufactured by Japan Zeon Corporation) was used in place of the organic binder with a Tg of −31° C. The formulation amounts and the like are shown in Table 1.

Example 6

A mounting member was prepared similarly to example 1, except that the formulation amount of silica sol (Snowtex O (product name) manufactured by Nissan Chemical Industries, Ltd.) was changed from 10 g to 5 g. The formulation amounts and the like are shown in Table 1.

Example 7

A mounting member was prepared similarly to example 1, except that the formulation amount of silica sol (Snowtex O (product name) manufactured by Nissan Chemical Industries, Ltd.) was changed from 10 g to 40 g. The formulation amounts and the like are shown in Table 1.

Comparative Example 1

The mounting member was prepared similarly to example 4, except that only an organic binder (Tg: +1° C.) was added to the aqueous solution containing aluminum sulfate, and silica sol was not added. The formulation amounts and the like are shown in Table 2. In this comparative example, an aggregated substance was precipitated by the liquid passing through the blanket, but results showed that the ambient temperature contact pressure of the sample was lower than the working examples and the like.

Comparative Example 2

A mounting member was prepared similarly to example 1, except that liquid sodium aluminate was not added to the dispersion containing the organic binder and the inorganic fine particles. The formulation amounts and the like are shown in Table 2. With this comparative example, precipitation of aggregated substance was not observed in the liquid that passed through the blanket, and therefore almost no organic binder and inorganic fine particles were attached to the sample fabricated thereby.

Comparative Example 3

A mounting member was prepared similarly to example 1, except that aluminum sulfate was not added to the 10 L of water. The formulation amounts and the like are shown in Table 2. With this comparative example, the precipitation of aggregated substance was not observed in the liquid that passed through the blanket, and almost no organic binder and inorganic fine particles were attached.

Evaluation Tests

The organic binder content, scattering ratio of fiber pieces, and contact pressure at ambient temperature (room temperature) were determined for each of the mounting members fabricated as described above in accordance with the following procedures.

Measurement of Organic Binder Content

A 25 mm×25 mm sample cut from each of the mounting members was dried for 1 hour in an oven at 110° C., and then the weight (W0) of the sample including the organic binder was measured. Next, the sample was heated for 1 hour in an oven at 900° C., and the weight after the organic binder had combusted (W1) was measured. The weight reduction during heating (LOI) corresponding to the content of the organic binder in the mat was calculated by the following equation.

Weight reduction from heating (LOI) wt %=($W0-W1$)/$W0$×100

Measurement of Scattering Ratio of Fiber Pieces

An impact tester was prepared in accordance with Japanese Industrial Standards (JIS K-6830) and then impact testing was performed in accordance with the directions shown in the standard.

(1) A test piece (size: 100 mm×100 mm) was prepared from a mounting member (size: 250 mm×250 mm) using a punching die, and then the mass was measured.

(2) The test piece was placed in an impact tester as shown in JIS K-6830, and then an impact was applied from an angle of 30°.

(3) After testing, the test piece was removed from the impact tester and the mass was again measured.

(4) The amount of scattering of the fiber pieces was calculated from the change in the test piece before and after testing.

Measurement of Contact Pressure of Mounting Member at Ambient Temperature (1) A round test piece (diameter: 45 mm) was prepared from a mounting member (size: 250 mm×250 mm) using a punching die, and then the mass was measured.

(2) The mat thickness that would provide a pillar density of 0.3 g/cm$^3$ was calculated from the measurement value of the mass.

(3) The test piece was placed on the center of a compression plate for a compression tester (model "Autograph AG-I" manufactured by Shimadzu Corporation), and then compressed at a speed of 20 mm/minute until the mat thickness determined by the above calculation was achieved. The pressure (contact pressure) at the peak was taken as the contact pressure (kPa) at ambient temperature.

TABLE 1

| | | | Working Example 1 | Working Example 2 | Working Example 3 | Working Example 4 | Working Example 5 | Working Example 6 | Working Example 7 |
|---|---|---|---|---|---|---|---|---|---|
| Solution | Aluminum sulfate added (g) | | 6.0 | 1.0 | 6.0 | 6.0 | 6.0 | 6.0 | 6.0 |
| | pH | | 4.5 | 6.2 | 4.5 | 4.5 | 4.5 | 4.5 | 4.5 |
| | Organic binder | Type | LX874 | LX874 | LX821 | LX811H | LX814 | LX874 | LX874 |
| | | Amount added (g) | 2.6 | 2.6 | 2.2 | 2.3 | 2.6 | 2.6 | 2.8 |
| | | Solid content (mass %) | 45 | 45 | 55 | 50 | 46 | 45 | 45 |
| | | Tg(° C.) | −31 | −31 | −13 | +1 | +25 | −31 | −31 |

TABLE 1-continued

|  |  |  | Working Example 1 | Working Example 2 | Working Example 3 | Working Example 4 | Working Example 5 | Working Example 6 | Working Example 7 |
|---|---|---|---|---|---|---|---|---|---|
|  | Inorganic fine particles | Type | Silica sol | Silica sol | Silica sol | Silica sol | Silica sol | Silica sol | Silica sol |
|  |  | Amount added (g) | 10.0 | 10.0 | 10.0 | 10.0 | 10.0 | 5.0 | 40.0 |
|  | Amount of liquid sodium aluminate added |  | 3.5 | 1.0 | 3.5 | 3.5 | 3.5 | 3.5 | 3.5 |
| Mounting member | Surface density (g/cm$^2$) |  | 1266 | 1233 | 1288 | 1231 | 1251 | 1266 | 1266 |
|  | Organic binder content (mass %) |  | 1.5 | 0.9 | 1.4 | 1.3 | 1.3 | 1.5 | 0.9 |
|  | Fiber scattering ratio |  | 0.17 | 0.16 | 0.33 | 0.30 | 0.39 | 0.19 | 0.39 |
|  | Ambient temperature contact pressure (kPa) |  | 121 | 111 | 107 | 98 | 96 | 102 | 112 |

TABLE 2

|  |  |  | Comparative Example 1 | Comparative Example 2 | Comparative Example 3 |
|---|---|---|---|---|---|
| Solution | Aluminum sulfate added (g) |  | 6.0 | 6.0 | — |
|  | pH |  | 4.5 | 4.5 | 7.0 |
|  | Organic binder | Type | LX811H | LX874 | LX874 |
|  |  | Amount added (g) | 2.2 | 2.7 | 2.6 |
|  |  | Solid content (mass %) | 50 | 45 | 45 |
|  |  | Tg (° C.) | +1 | −31 | −31 |
|  | Inorganic fine particles | Type | — | Silica sol | Silica sol |
|  |  | Amount added (g) | — | 10.0 | 10.0 |
|  | Amount of liquid sodium aluminate added |  | 3.5 | — | 3.5 |
| Mounting member | Surface density (g/cm$^2$) |  | 1241 | 1245 | 1248 |
|  | Organic binder content (mass %) |  | — | 0.31 | 0.38 |
|  | Fiber scattering ratio |  | 0.22 | 0.22 | 0.25 |
|  | Ambient temperature contact pressure (kPa) |  | 94 | 92 | 115 |

Measurement of Heated Mounting Member Contact Pressure (1) Similarly to example 1, a round test piece (diameter: 45 mm) was prepared from a mounting member (size: 250 mm×250 mm) using a punching die, and then the mass was measured.

(2) The mat thickness where the filler density was 0.23 g/cm$^3$ (excluding the combusted components such as organic components) was calculated from the measurement value of the mass.

(3) The test piece was clamped between 2 (stainless steel) plates of a compression tester (model "Autograph AG-I" manufactured by Shimadzu Corporation), and then compressed at a speed of 20 mm/minute until the mat thickness determined by the above calculation was achieved.

Figure 5:
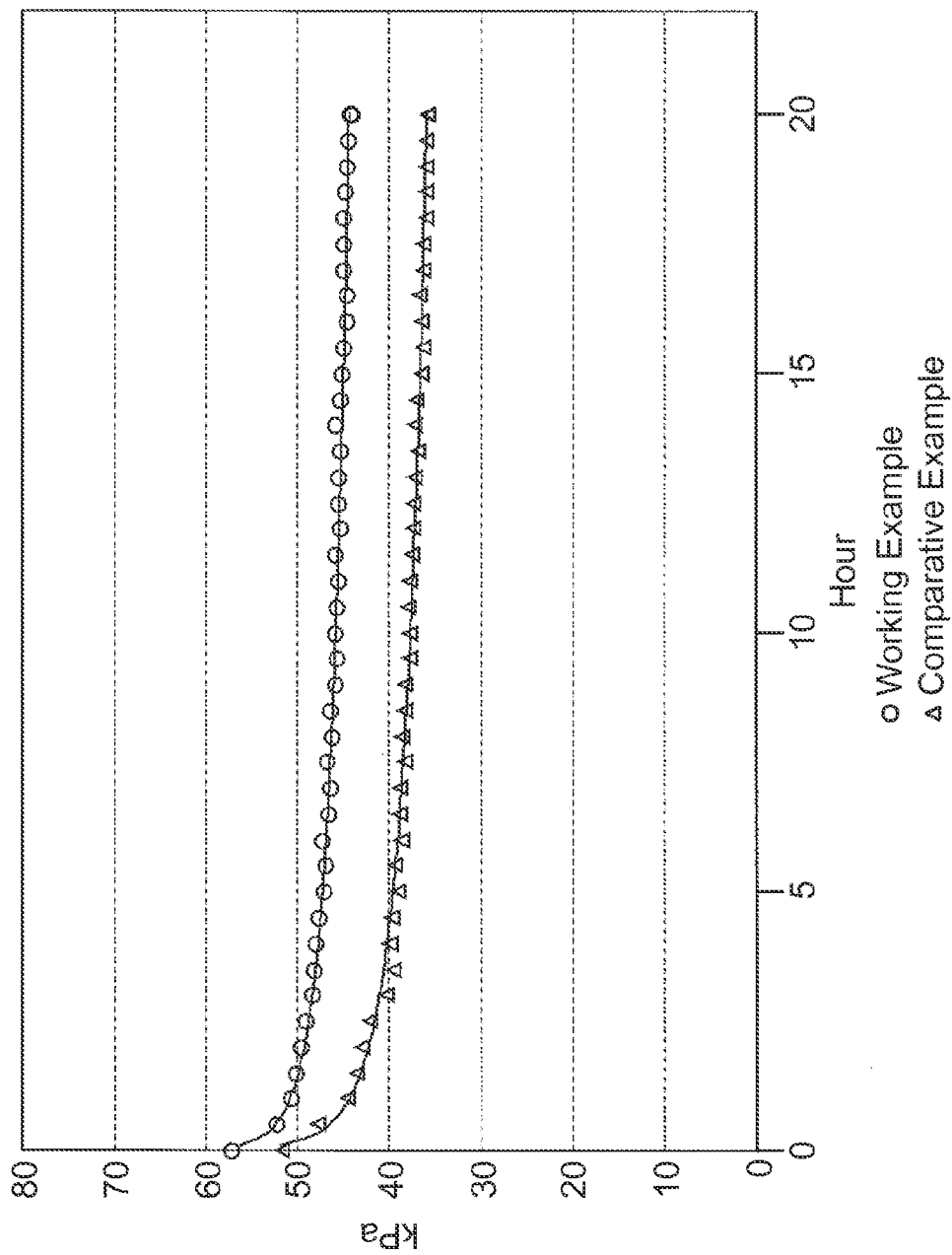
FIG. 5 is a graph showing the change over time of the contact pressure of a heated mounting member.

(4) While compressing the test piece, one of the two plates was heated to 900° C., while the other was heated to 650° C. In order to observe the change in contact pressure over time, the contact pressure was measured every 30 min. for 20 hours after the two plates had reached 900° C. and 650° C. respectively (test start time). The results are shown in Table 3 and FIG. 5. Note, the change in contact pressure can be approximated by the following equation, and the contact pressure after 10 years can be calculated from this approximation formula.

$$Y = aX^b$$

In the formula, X represents time (hr); Y represents contact pressure (kPa); and a, b represent coefficients.

A test piece was fabricated from the mounting member produced in a manner similar to comparative example 1, and in addition to providing for measurements, the contact pressure was measured as described above. The results are shown in Table 3 and FIG. 5.

TABLE 3

|  | Test mounting member | Working Example 1 | Comparative Example 1 |
|---|---|---|---|
| Contact pressure (kPa) | At start of test | 57.1 | 51.6 |
|  | After 20 min. from start of test | 44.0 | 35.7 |
|  | After 10 years (calculated from approximation equation) | 30.4 | 19.9 |

What is claimed is:

1. A mounting member for wrapping and mounting a pollution control element in a casing of a pollution control device, comprising:
    a needle punched mat having inorganic fiber material; and
    an aggregated substance containing aggregates of an organic binder and inorganic fine particles, which aggregates are impregnated throughout most of the needle punched mat, wherein the mat is impregnated with the aggregates after the mat is needle punched.

2. The mounting member according to claim 1, wherein the organic binder is acrylic latex having glass transition temperature (Tg) of 15° C. or less.

3. The mounting member according to claim 1, wherein the total content of the organic binder in the mat is in the range of greater than 0 up to and including 5% by weight.

4. The mounting member according to claim 1, wherein the inorganic particles are made using at least one material selected from the group consisting of metal-oxide, nitride, carbide and combinations thereof.

5. The mounting member according to claim 1, wherein the inorganic fine particles have an average particle diameter of 1 micrometer or less.

6. The mounting member according to claim 5, wherein each aggregate of the aggregated substance has an average diameter in the range of from 20 micrometers or more and 2 mm or less.

7. The mounting member according to claim 1, wherein each aggregate of the aggregated substance has an average particle diameter of 1 micrometer or more.

8. A pollution control device comprising:
a casing,
a pollution control element provided within the casing, and
a mounting member arranged between the casing and the pollution control element,
wherein the mounting member is the mounting member described in claim 1.

9. The pollution control device according to claim 8, wherein the pollution control element is a catalyst support or a filter element.

10. The pollution control device according to claim 8, wherein the mounting member has been exposed to high temperature conditions of the pollution control device such that the organic binder combusts and the inorganic fine particles adhere to the surface of the inorganic fibers and form sintered bodies.

11. A method of manufacturing the mounting member according to claim 1, said method comprising the steps of:

preparing a liquid in which aggregates of an organic binder and inorganic fine particles are precipitated;
preparing a mat containing inorganic fibers, and
impregnating the aggregates throughout most of the mat.

12. The method according to claim 11, wherein the step of preparing the liquid includes a step of preparing a liquid wherein the aggregates are precipitated in a mixture liquid containing a colloid solution, having inorganic fine particles dispersed therein, and an organic binder.

13. The method according to claim 11, wherein the organic binder is acrylic latex having a glass transition temperature (Tg) of 15° C. or less.

14. The method according to claim 11, wherein the inorganic fine particles have an average particle diameter of 1 micrometer or less.

15. The method according to claim 11, wherein each of the aggregates precipitated in the liquid has an average diameter in the range of from 20 micrometers or more and 2 mm or less.

16. The method according to claim 11, wherein the mat is a needle-punched mat.

17. The mounting member according to claim 1, wherein each aggregate of the aggregated substance has an average diameter in the range of from 20 micrometers or more and 2 mm or less.

18. The mounting member according to claim 1, wherein the needle punched mat comprises alumina fibers.

19. The mounting member according to claim 1, wherein each aggregate contains the organic binder and inorganic fine particles prior to the mounting member being exposed to high temperature conditions of the pollution control device.

20. The mounting member according to claim 1, wherein the aggregates are impregnated throughout most of the needle punched mat so as to be attached to the inorganic fibers such that the organic binder covers at least a portion of the surface of the inorganic fibers and prevents scattering of fiber pieces.

* * * * *